(12) United States Patent
Woitrin et al.

(10) Patent No.: US 11,869,286 B2
(45) Date of Patent: Jan. 9, 2024

(54) METHOD AND SYSTEM FOR INSPECTING AN ASSET

(71) Applicant: Inspectron, Inc., Novi, MI (US)

(72) Inventors: Gaetan Woitrin, Brussels (BE); Jonathan Marlow, Dearborn, MI (US)

(73) Assignee: INSPECTRON, INC., Novi, MI (US)

( * ) Notice: Subject to any disclaimer, the term of this patent is extended or adjusted under 35 U.S.C. 154(b) by 405 days.

(21) Appl. No.: 17/006,040

(22) Filed: Aug. 28, 2020

(65) Prior Publication Data

US 2021/0065475 A1 Mar. 4, 2021

Related U.S. Application Data

(60) Provisional application No. 62/893,989, filed on Aug. 30, 2019.

(51) Int. Cl.
*G07C 5/08* (2006.01)
*G07C 5/00* (2006.01)

(52) U.S. Cl.
CPC .......... *G07C 5/0808* (2013.01); *G07C 5/008* (2013.01); *G07C 2205/02* (2013.01)

(58) Field of Classification Search
CPC .. G07C 5/0808; G07C 5/008; G07C 2205/02; G07C 5/006; G06Q 10/20
See application file for complete search history.

(56) References Cited

U.S. PATENT DOCUMENTS

| | | | |
|---|---|---|---|
| 2007/0293997 A1 | 12/2007 | Couch | |
| 2012/0209470 A1* | 8/2012 | Gilbert | G06Q 10/087 707/769 |
| 2016/0034590 A1* | 2/2016 | Endras | G06Q 30/08 707/770 |
| 2017/0206718 A1* | 7/2017 | Kapoor | G07C 5/0808 |
| 2018/0150805 A1* | 5/2018 | Shaver | G06Q 10/20 |
| 2019/0168787 A1 | 6/2019 | Messinger et al. | |
| 2021/0065475 A1* | 3/2021 | Woitrin | G07C 5/008 |

OTHER PUBLICATIONS

Extended European Search Report dated May 21, 2021.

* cited by examiner

*Primary Examiner* — Sizo B Vilakazi
(74) *Attorney, Agent, or Firm* — Dickinson Wright PLLC

(57) ABSTRACT

A system for determining a condition of an asset such as a vehicle or a machine tool includes a diagnostic tool. The diagnostic tool for determining a condition of a vehicle includes an inspection unit having a scanner, a camera, a laser pointer, and a thermometer, a communication unit having a transceiver, a wireless and a Bluetooth, and a user interface unit having a microphone, LED lights and a speaker. The diagnostic tool acquires a vehicle identification number (VIN), transmits the VIN information, and receives basic information including an inspection procedure provided from a manufacturer of the vehicle and history information of the vehicle associated with the acquired VIN for providing a new health condition of the vehicle under inspection. A method for determining a condition of an asset is also performed by the system including the diagnostic tool.

20 Claims, 9 Drawing Sheets

METHOD AND SYSTEM FOR INSPECTING AN ASSET

RELATED APPLICATIONS

The present patent document claims the benefit of and priority to U.S. Provisional Application 62/893,989, filed Aug. 30, 2019, and entitled "Method and System for Inspecting an Asset" the entire contents of which are incorporated herein by reference.

FIELD

The present disclosure relates to a method and system for inspecting the condition of assets.

BACKGROUND

Diagnostic tools are generally used for determining the condition of an asset such as a vehicle or a machine tool. Nowadays, for example, inspection of vehicles has become an important aspect in many industries to ascertain the condition of the vehicles. These industries may include vehicle repair, insurance adjustment, and rental car industries. Proper inspection is desired to ascertain that the vehicles are good condition and do not suffer any major defects.

SUMMARY

For increasing capabilities of the diagnostic tools, the diagnostic tools may be built with various technologies such as sensors, cameras, scanners, and remote communication systems. In addition, the diagnostic tools can be directly linked to a remote main server or a vehicle's data link connector in order to communicate with vehicle's on-board diagnostic system.

An inspector or a user who uses a diagnostic tool may manually input information such as a vehicle identification number (VIN), a year of the vehicle, a make of the vehicle, and the like. The user may also manually input damage areas by typing or voice-recording after inspecting the vehicle with the diagnostic tools. After that, the recorded data is later used for repairing the damage areas or storing the information as a condition of the vehicle. However, the recorded condition of the vehicle or machine tool for looking up and repairing in order may be missed or mis-matched to the vehicle which is inspected.

During a manual operation, furthermore, the user may enter the information incorrectly, have forgotten to input the information, or input mistakenly the damage areas. Thus, such type of the manual operation for the inspection of the vehicle may be unreliable, and inefficient in order to ascertain the condition of the vehicles. Such type of the manual operation for the inspection of the vehicle may be taken a long time to repair or fix the vehicle or a burden task for the user.

In some implementations, the present disclosure provides a system and method for automatically determining a condition of an asset with a diagnostic tool.

According to one aspect of the present disclosure, the diagnostic tool may include a processor and a memory for determining a condition of a vehicle. The diagnostic unit may include an inspection unit having a scanner for acquiring a vehicle identification number (VIN) associated with the vehicle, a camera for capturing an image or video of the vehicle, a communication unit having a transceiver transmitting and receiving messages and data (information) to/from various components of a system environment, a user interface unit having a microphone recording a voice-inspection or communication with the components of the system environment in a real time, and a speaker delivering the received messages and data to a user. The diagnostic tool may received an inspection procedure transmitted from the system environment based on the acquired VIN, and may inspect the vehicle according to the inspection procedure of the vehicle associated with the acquired VIN.

The communication unit may transmit the acquired VIN information to a remote server including a database, and may receive basic information including procedure, and history information of the vehicle associated with the acquired VIN. The basic information includes a make, a model, a year, and a type of the vehicle, and the inspection procedure provided from a manufacturer of the vehicle, and the history information includes a previous inspection record including a maintenance record, and an accident record.

According to a further aspect of the present disclosure, the inspection unit further of the diagnostic tool includes a laser pointer measuring a size of a damage area of the vehicle, and thermometer measuring a thermal data on a part of the vehicle.

The diagnostic tool may capture a still image or video of the vehicle under inspection, measure the size of the damage area of the vehicle, and transmit the captured still image or video and the measured size to store in a remote server including a database, and/or a cloud storage. The captured and measured data of the vehicle under inspection may be compared to basic and history information of the vehicle, and a new health condition of the vehicle may be determined accordingly.

The new health condition of the vehicle under inspection may be determined by communicating with an agent in real time through the microphone of the diagnostic tool and a service information for repairing the damage area of the vehicle may be provided.

According to one aspect of the present disclosure, a method for determining a condition of an asset is provided. The method may include the steps of capturing an identifier associated with the asset using a diagnostic tool, acquiring basic information including an inspection procedure provided from a manufacturer of the asset and/or history information of the asset associated with the captured identifier, inspecting an exterior and interior condition of the asset according to the acquired inspection procedure using the diagnostic tool, determining a new health condition of the asset by comparing the inspected exterior and interior condition to the acquired basic and history information of the asset, and providing the new health condition of the asset including a service information by communicating with a system environment in real time.

According to a further aspect of the present disclosure, the method further may include the steps of transmitting the captured identifier information to a remote server including a database, and receiving the basic information and/or the history information of the asset associated with the captured identifier. The identifier includes a vehicle identification number (VIN) or a bar code or QR code. The basic information may include a make, a model, a year, and a type of the asset, and the inspection procedure provided from a manufacturer of the asset, and the history information may include a previous inspection record including a maintenance record, and an accident record.

According to a further aspect of the present disclosure, the method further may include the step of capturing an image or video on the interior and exterior condition of the asset using a camera of the diagnostic tool.

According to a further aspect of the present disclosure, the method further may include the step of measuring a size of a damage area of the asset under inspection using a laser pointer of the diagnostic tool, and measuring a thermal data of the asset under inspection using a thermometer of the diagnostic tool.

According to a further aspect of the present disclosure, the method further may include the step of comparing the captured image or video and the measured size or thermal data of the asset to the basic and history information of the asset associated with the acquired identifier.

According to a further aspect of the present disclosure, the method further may include the step of diagnosing the new health condition of the asset and storing the new health condition of the asset under inspection in a remote server including a database, and a cloud storage.

According to a further aspect of the present disclosure, the method further may include the step of communicating with an agent sitting in a remote office for determining the new health condition of the asset in real time. The asset includes a vehicle or a machine tool.

According to one aspect of the present disclosure, a system for determining of a condition of an asset may include a diagnostic tool to capture an identifier associated with the asset, acquire basic information including an inspection procedure provided from a manufacturer of the asset and history information of the asset associated with the captured identifier, inspect an exterior and interior condition of the asset according to the acquired inspection procedure, determine a new health condition of the asset, and communicate with a system environment for the new health condition of the asset in real time. The asset may include a vehicle or a machine tool, and the identifier may include a vehicle identification number (VIN) or a bar code or QR code.

Further details and benefits will become apparent from the following detailed description of the appended drawings. The drawings are provided herewith purely for illustrative purposes and are not intended to limit the scope of the present disclosure.

DRAWINGS

In order that the disclosure may be well understood, there will now be described various forms thereof, given by way of example, reference being made to the accompanying drawings, in which.

Figure 1:
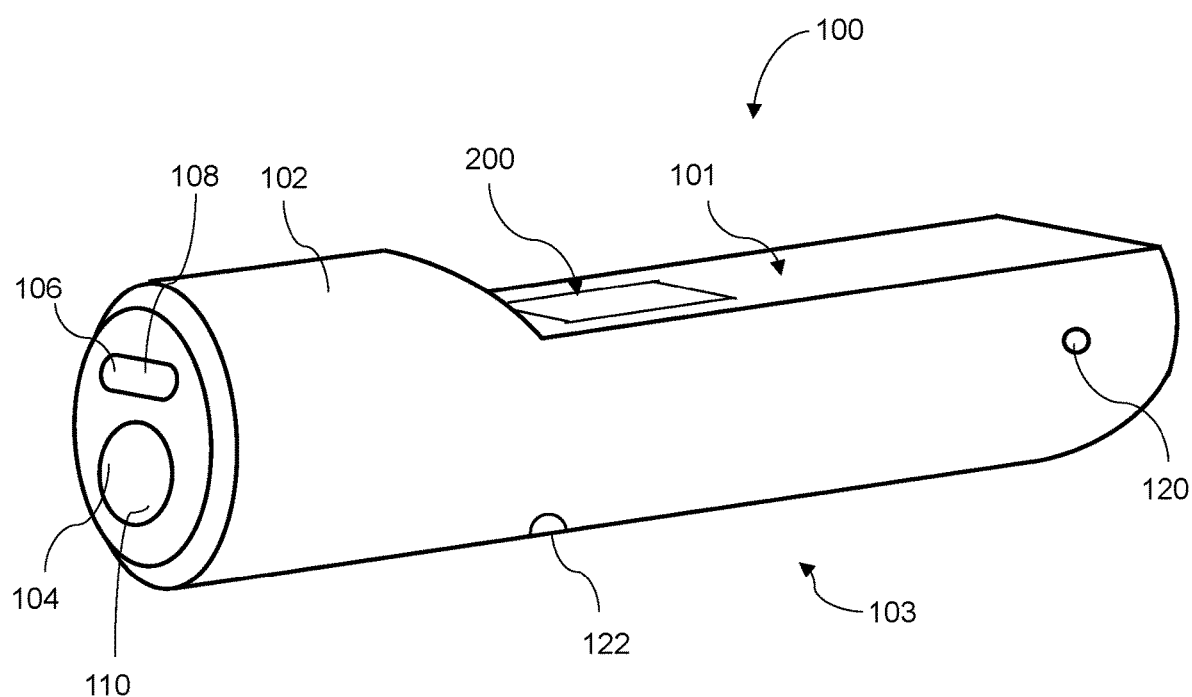
FIG. 1 shows a perspective view of a diagnostic tool according to an exemplary form of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the drawings, corresponding reference numerals indicate like or corresponding parts and features.

FIG. 1 illustrates a perspective view of a diagnostic tool 100 according to an exemplary form of the present disclosure. The diagnostic tool 100 may include a housing 102, a camera 104, a scanner 106, a laser pointer 108, a thermometer 110, and an operator panel 200. The diagnostic tool 100 may have a self-leveling (Up-is-Up) technology adjusting automatically the orientation of the image or a gravity indicator when the camera 104 captures the images or videos as the orientation of the tool 100 changes. The housing 102 is a handheld device that is like a flashlight design for easily diagnosing any type of assets 10 such as a vehicle 12 (shown in FIG. 4A). However, the housing 102 can be designed by any type of shapes according to another form of the present disclosure. The diagnostic tool 100 further may include a built-in microphone 112 and a speaker 114 for communicating with an agent 56 including an insurance adjuster.

The camera 104 may include a lens, or two or as many as needed, a flash, connectors, and a display (not shown) for recording images or videos. The camera 104 is capable of recording still images, a series of still images, or videos. The lens zoom and focus features could be digitally enhanced by software on the diagnostic tool 100 or the camera 104. The diagnostic tool 100 includes its own memory 116 and processor 118 for saving the taken images or videos. Accordingly, the captured still images or videos may be stored in the diagnostic tool 100, and transmitted to a remote server 52 including a database 60 or a cloud storage 54.

As shown in FIG. 1, the scanner 106 may be any suitable reader for obtaining information regarding a particular asset 10 such as a vehicle 12 (FIG. 4A) or a machine tool 14 (FIG. 4B) under inspection. For example, when the vehicle 12 is inspected, a vehicle identification number (VIN) 22 or a bar code 24 is scanned and acquired by the scanner 106 of the diagnostic tool 100. A QR code may also be used in addition to, or in the alternative to the bar code 24. When the machine tool 14 is inspected, a bar code 24 or QR code including a machine tool identification number 26 may also be scanned and acquired by the scanner 106. The scanned information may be automatically stored in the memory 116 of the diagnostic tool 100 and/or the cloud storage 54, and also transmitted to the remote server 52 including the database 60. When the scanner 106 is incapable of reading the VIN 22 or machine tool identification number 26, a user may manually input the VIN 22 or machine tool identification number 26.

The diagnostic tool 100 may include the laser pointer 108 for inspecting a damage area 16 on an interior or exterior of the vehicle 12 or the machine tool 14. The laser pointer 108 may be configured to measure a size such as a depth or a dimension of the damage area 16. For example, when the vehicle 12 or the machine tool 14 is inspected, the measured sizes including the depth and area by the laser pointer 108 are also stored in the memory 116 of the diagnostic tool 100, the cloud storage 54 and/or the remote server 52. The measured size of the damage area 16 may be compared to an original size which is not damaged or the previously stored history data of the vehicle 12 in real time.

As shown in FIG. 1, the diagnostic tool 100 further may include a thermometer 110 on same face as the camera 104 for a thermal measurement. Accordingly, the diagnostic tool 100 may acquire a thermal data of the asset 10 such as the vehicle 12 or the machine tool 14 by the thermometer 110. Furthermore, the diagnostic tool 100 may include the embedded microphone 112 and speaker 114 located in a rear 103 and/or a side of the diagnostic tool 100, and includes charging contact points 120 located in both sides of the diagnostic tool 100 for charging the tool 100. On the rear 103 of the diagnostic tool 100, a tripod mount 122 may be located for coupling with a tripod mount device (not shown).

Figure 2:
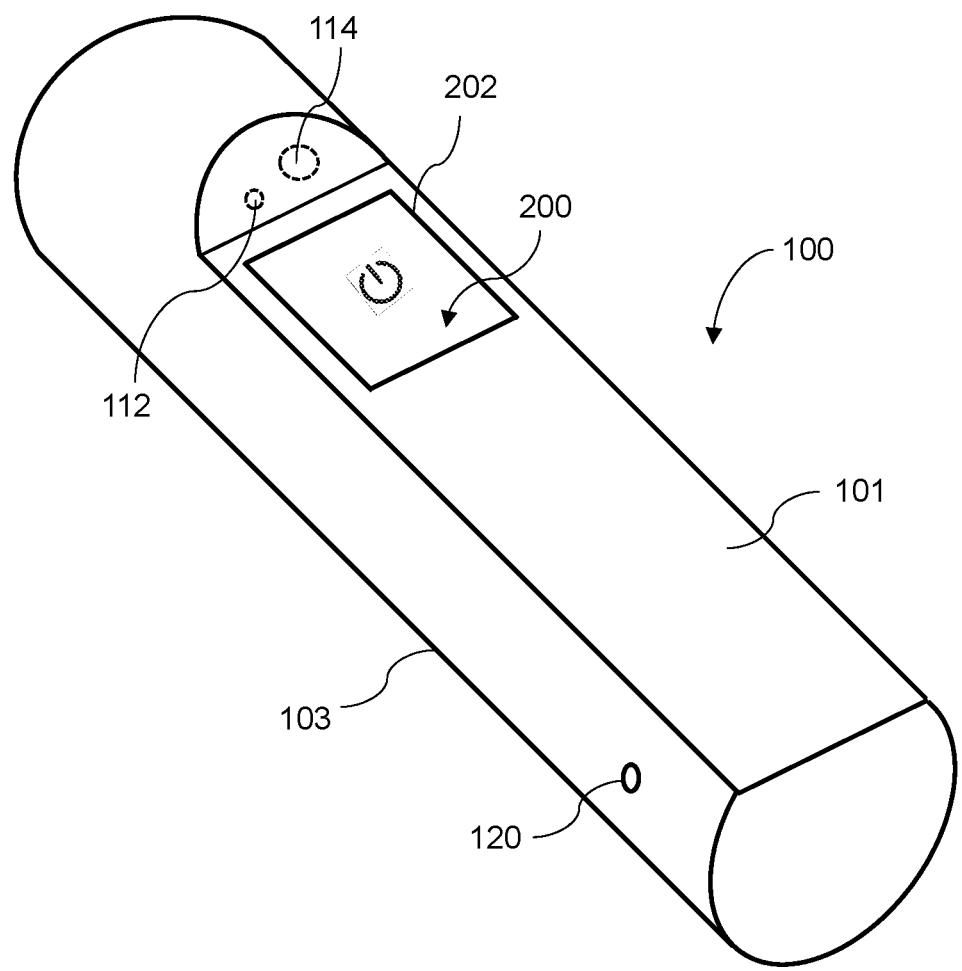
FIG. 2 shows another perspective view of the diagnostic tool in FIG. 1.

Referring to FIG. 2, the diagnostic tool 100 may include an operator panel 200 located on a front 101 of the tool 100 according to an exemplary form of the present disclosure. However, the location of the operator panel 200 may be changed to other areas (the rear 103 or side) according to different shapes or designs of the diagnostic tool 100. As shown in FIG. 2, the operator panel 200 includes a button pad with five individual buttons, and may be configured to easily operate in a hand-held position of the user. Furthermore, the operator panel 200 may include LED lights 202 around the button pad for indicating an operation status of the diagnostic tool 100 such that the LED lights 202 are easily visible when the tool 100 is held in the user's hand.

Figure 3:
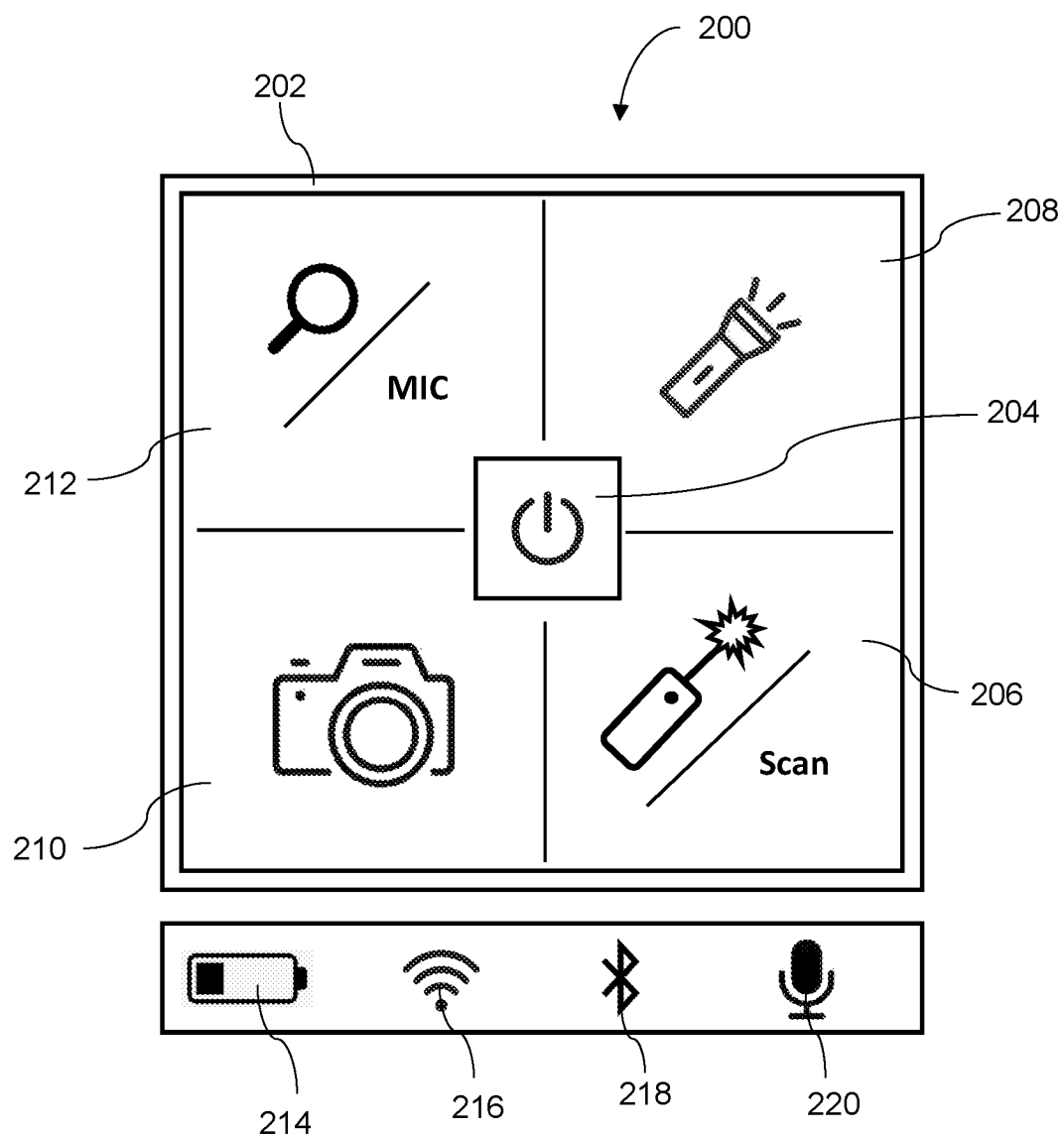
FIG. 3 shows a diagram illustrating an operator panel of the diagnostic tool in FIG. 1.

Referring to FIG. 3, the operator panel 200 has at least five buttons for operating the diagnostic tool 100. As shown in FIG. 3, an ON/OFF button 204 may be located in a center of the operator panel 200 for turning on or off the tool 100. The ON/OFF button 204 itself has an ON/OFF light for indicating whether the power is failed. A scanner and laser pointer button 206 may be located in a lower and right side of the operator panel 200 for operating the scanner 106 or the laser pointer 108. A light control button 208 may be located in an upper and right side of the operator panel 200 for operating a flash light (not shown), and an image and video capture button 210 may be located in a lower and left side of the operator panel 200 for operating the camera 104. In addition, a zoom and microphone button 212 may be located in an upper and left side of the operator panel 200 for operating a zoom of the camera 104 and a microphone 112 of the tool 100. The LED lights 202 located next to each of the buttons may be configured for indicating the operation status of each button. For example, when the scanner 106 is used for inspecting the vehicle 12 by pressing the scanner and laser pointer button 206, the LED light 202 next to the scanner and laser pointer button 206 may be turned on a white (while scanning) and then changed to purple when finished. Each of the LED lights 202 next to each button is indicated with its own color.

As shown in FIG. 3, the operator panel 200 further may include icons each indicating a status of a battery 214, a Wifi 216, a Bluetooth 218, and a MIC 220. For example, the battery icon 214 may illuminate red while charging, green when the charging is complete, and is blink rapidly to indicate an error condition. For example, the Wifi icon 216 may illuminate green when the tool 100 is wirelessly connected to a network 62, and red when its wireless connection is failed. The Bluetooth icon 218 may illuminate blue when connected, and is off when disconnected, and the microphone icon 220 may illuminate white when the microphone 112 is used and is off when it is not used.

Figure 4A:
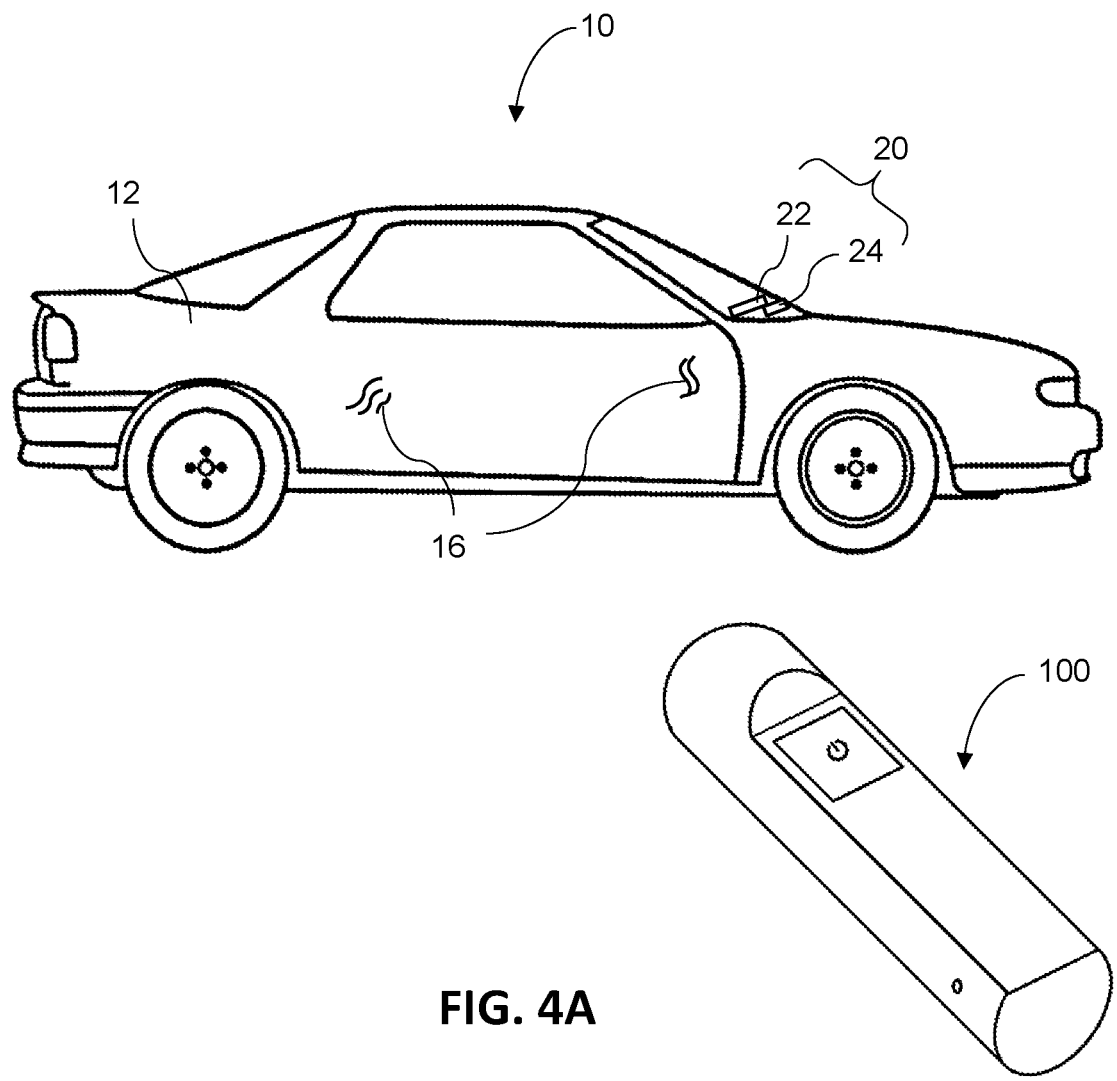
FIG. 4A shows a vehicle with a diagnostic tool according to an exemplary form of the present disclosure.
Figure 4B:
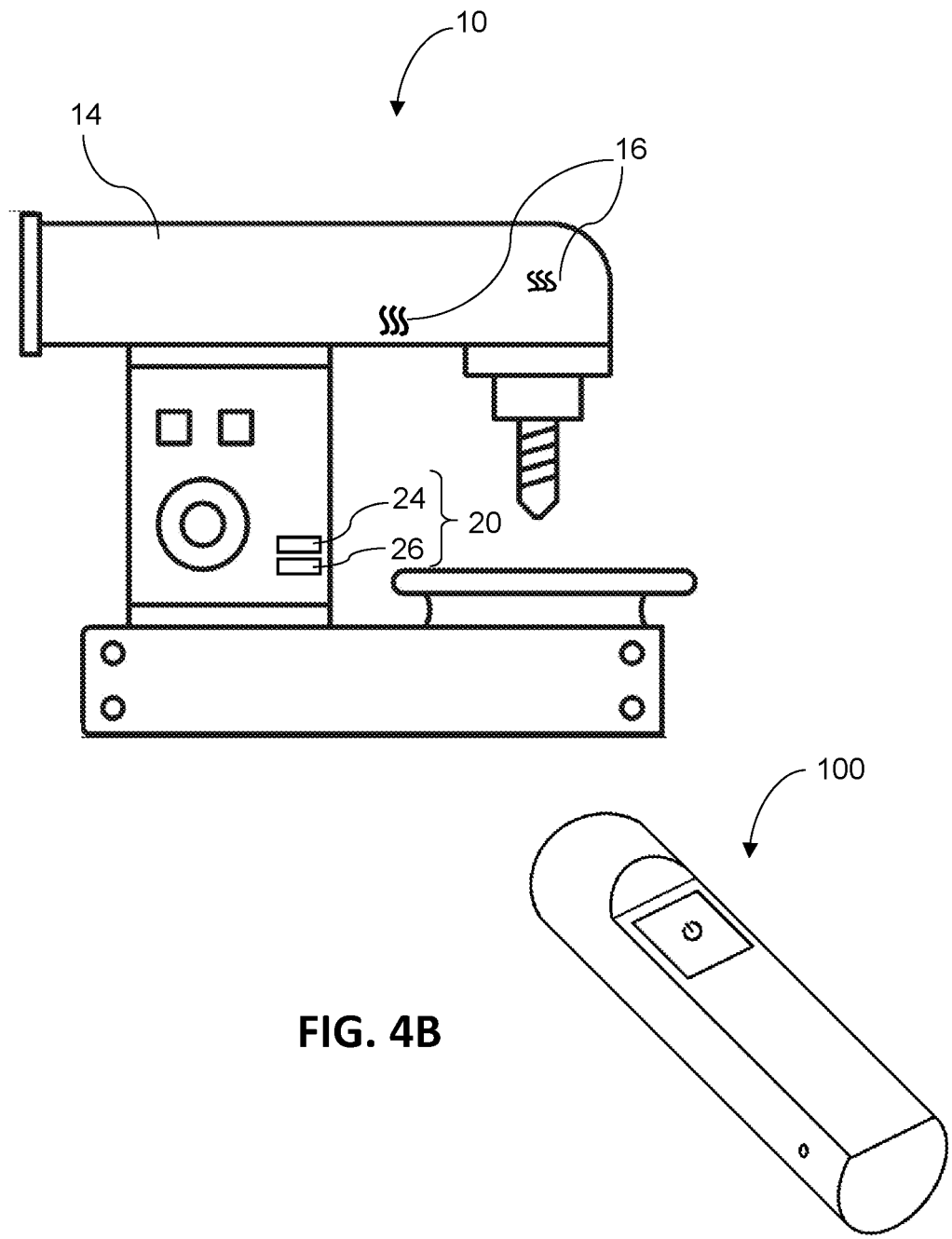
FIG. 4B shows a machine tool with a diagnostic tool according to an exemplary form of the present disclosure.

Referring to FIGS. 4A and 4B, the diagnostic tool 100 may be used for inspecting various assets 10 such as moving vehicles including a vehicle 12, a motorcycle, a cart, an airplane, a ship, etc. (not shown), and machine tools 14. FIG. 4A shows a vehicle 12 under inspection using the diagnostic tool 100 according to an exemplary form of the present disclosure. The vehicle 12 includes various interior and exterior features such as, but not limited to, an engine/transmission system or electric motor, a fuel tank or a battery pack, chassis, and windows, etc.

Further, as shown in FIG. 4A, the vehicle 12 may include an identifier 20 such as a vehicle identification number (VIN) 22 associated with the particular vehicle 12 and attached to the vehicle 12. The VIN 22 includes, but not limited to, codes (basic information) identifying a type of the vehicle 12, a model of the vehicle 12, a year of the vehicle 12 and a make of the vehicle 12. In addition, the VIN 22 may include an engine size, number of cylinder in the engine, and a manufactured location of the vehicle 12, etc.

FIG. 4B shows a machine tool 14 under inspection using the diagnostic tool 100 according to another exemplary form of the present disclosure. The machine tool 14 may be a power tool, such as a lathe or milling machine, used for cutting or shaping metal, wood, or other material, etc., and the machine tool 14 may employ some sort of tool that does the cutting or shaping. The machine tools 14 may have some means of constraining the workpiece and provide a guided movement of the parts of the machine. Accordingly, the machine tool 14 may include various features such as, but not limited to, a motor for generating a power, a sliding guide, and an exterior case.

Further, as shown in FIG. 4B, the machine tool 14 may include an identifier 20 such as a bar code 24 or QR code including a machine tool identification number 26 associated with the particular machine tool 14 and attached to the machine tool 14. The bar code 24 or QR code may include, but not limited to, codes (basic information) identifying a type of the machine tool 14, a model of the machine tool 14, a year of the machine tool 14 and a make of the machine tool 14, etc.

Figure 5:
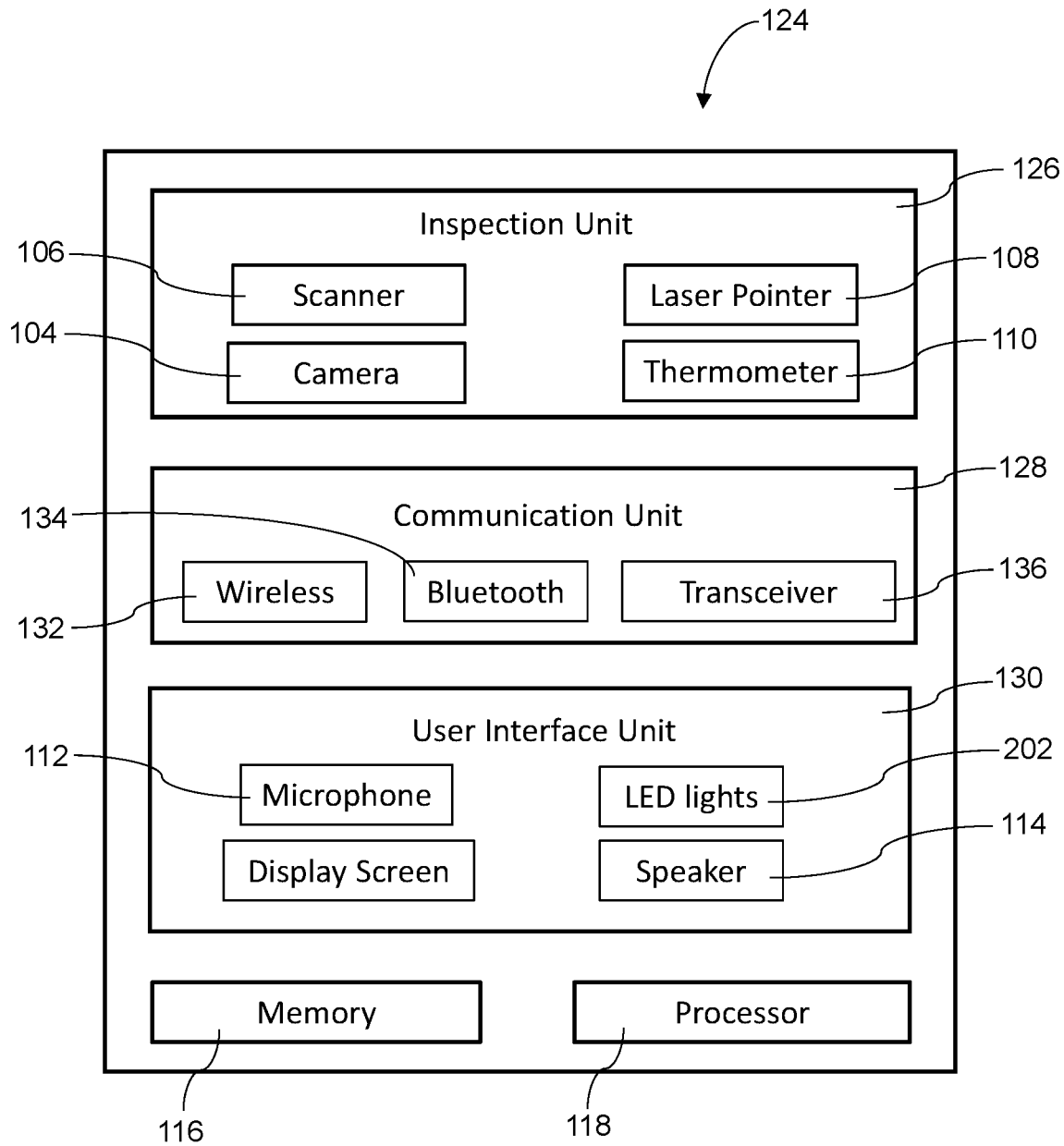
FIG. 5 is a block diagram illustrating a computing system of the diagnostic tool of FIG. 1.
Figure 6:
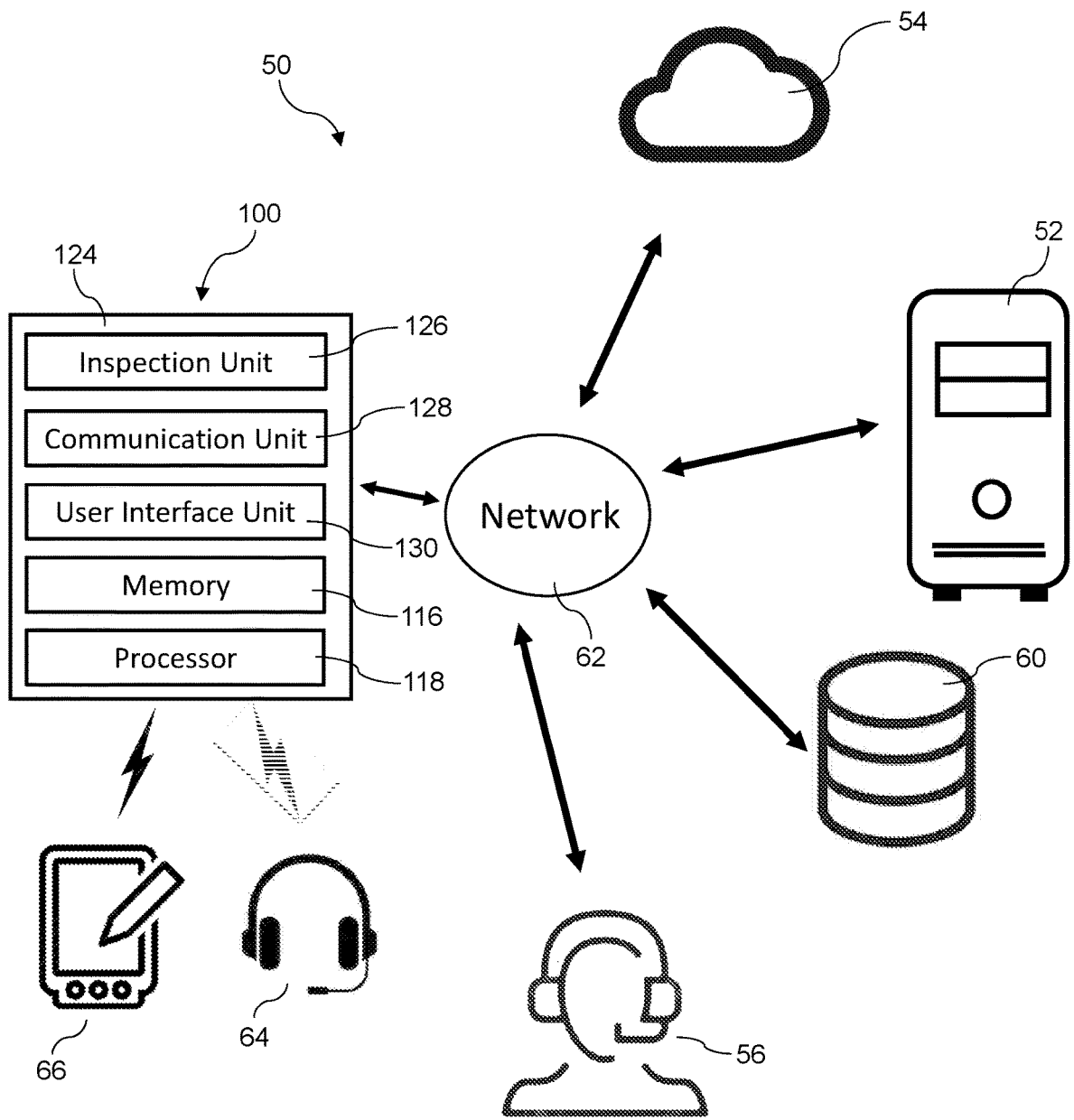
FIG. 6 is a block diagram illustrating a system environment of the diagnostic tool of FIG. 1.

FIGS. 5 and 6 show a computing system 124 and a system environment 50 of the diagnostic tool 100. The computing system 124 may include three different units such as an inspection unit 126 having the camera 104 including an image sensor (not shown), the scanner 106 for capturing an identifier 20, the laser pointer 108 for measuring a size, and the thermometer 110, an communication unit 128 having a wireless 132, a Bluetooth 134 for using a headset 64 or a personal digital assistant (PDA) 66, and a transceiver 136 for communicating with the network 62 including the remote server 52 and the cloud storage 54, and a user interface unit 130 including the microphone 112 for communicating or voice-recording, LED lights 202 for indicating the operation status of the diagnostic tool 100, the speaker 114, and a display screen (not shown). In addition, the computing system 124 further includes the memory 116 for storing all information and a processor 118 for computation.

The processor 118 may include suitable logic, circuitry, and/or interfaces that are operable to execute one or more instructions stored in the memory 116 to perform predetermined operations. The processor 118 may be implemented using one or more processor technologies known in the art. The memory 116 may store a set of instructions and data as the remote server 52. Some of the commonly known memory implementations include, but not limited to, a random access memory (RAM), a read only memory (ROM), a hard disk drive (HDD), and a secure digital (SD) card. The memory 116 also may store the set of the transmitted data corresponding to the assets 10 and the captured data by the diagnostic tool 100.

As described above, the communication unit 128 in the computing system 124 may include the transceiver 136 transmitting and receiving messages and data (or information) to/from various components of the system environment 50 (e.g., the diagnostic tool 100, the remote server 52, the cloud storage 54, the agent 56, and the database 60) over the network 62. Examples of the transceiver 136 may include, but not limited to, an antenna, an Ethernet port, a USB port, or any other port that can be configured to receive and transmit data. The transceiver 136 transmits and receives data/messages according to the various communication protocols, such as, TCP/IP, UDP, and 2G, 3G, 4G, or 5G communication protocols.

Referring back to FIG. 4A, the inspection of the vehicle 12 may be performed using the diagnostic tool 100 according to an exemplary form of the present disclosure. Since the inspection of the machine tool 14 in FIG. 4B may be performed in the same way as the inspection of the vehicle 12, the description of inspection of the machine tool 14 is omitted. The inspection tool 100 may guide a user such as a user (or a technician) in conducting the inspection of the vehicle 12. For performing the inspection of the vehicle 12, the user may activate the ON/OFF button 204 and record the user's name or identification number by a voice-recording. Accordingly, all information during the inspection of the particular vehicle 12 may be automatically stored in the memory 116 of the tool 100, the remote server 52 including the database 60, and the cloud storage 54 under the user's account who performs the inspection. The user also activates the diagnostic tool 100 by a voice command through the embedded microphone 112 or the headset 64.

FIG. 6 shows a block diagram illustrating the system environment 50 of the computing system 124 of the diagnostic tool 100 according to an exemplary form of the present disclosure. The system environment 50 may include the diagnostic tool 100 including the computing system 124, the remote server 52 including the database 60, the cloud storage 54, and the agent 56 (or the insurance adjuster), which may be interconnected over the network 62.

As described above, the diagnostic tool 100 may guide the user for conducting the inspection of the vehicle 12. When the diagnostic tool 100 is turned on, the user may hear a voice guide for scanning the VIN 22 of the vehicle 12. The diagnostic tool 100 may scan the identifier 20 such as the VIN 22 associated with the vehicle 12, and automatically store the VIN 22 information in the memory 116 of the tool 100, the cloud storage 54 and the remote server 52. In addition, the diagnostic tool 100 may transmit the VIN 22 information to the remote server 52 including the database 60 in real time.

The remote server 52 may be connected with the database 60 including basic information such as a make, a model, a year, a type, and an inspection procedure or step of the vehicle 12 and history information such as an inspection record, an accident record, and a maintenance record of the vehicle associated with VIN 22. For example, the remote server 52 may receive a request for transmitting the basic and history information from the diagnostic tool 100 based on VIN 22 information, and check the database 60 for collecting the information of the vehicle 12 associated with the received VIN 22. The database 60 further stores information related to the inspection of the vehicle 12. The information related to the inspection of the vehicle 12 may include, but is not limited to, the original interior or exterior images of the vehicle 12. In addition, the database 60 may include the inspection procedure or step of the particular vehicle 12 provided by a manufacturer of the vehicle 12.

Based on the request from the diagnostic tool 100, the remote server 52 may communicate with the diagnostic tool 100 and transmit the collected information corresponding to the VIN 22 associated with the vehicle 12. For example, the collected information from the database 60 may include the basic information such as the model, type, make, and year of the vehicle 12, and the history information such as the previous inspection record, accident record, and also the inspection procedure or step of the vehicle 12 provided from the manufacturer of the vehicle 12.

The previous inspection report may include regular check-ups of the vehicle 12 such as an oil change and a mileage check-up. The inspection procedure or step of the vehicle 12 may be provided from the manufacturer of the vehicle 12 because each vehicle 12 has its own inspection procedure or step when the vehicle needs to be inspected. Accordingly, the remote server 52 may transmit some or all the information associated with the VIN 22 of the vehicle 12 to the diagnostic tool 100 such that the user follows the received inspection procedure or step of the vehicle 12. For example, the user interface unit 130 of the computing system 124 speaks the inspection procedure or step of the particular vehicle 12 step by step through the speaker 114, and the user follows the inspection procedure or step of the vehicle 12 without missing any step or any mistake. According to another exemplary form of the present disclosure, the display screen (not shown) may show the inspection procedure or step of the particular vehicle 12, and the user follows the step on the display screen, and marks each step when each inspection step is performed.

As shown in FIG. 4A, the vehicle 12 may be inspected according to the inspection procedure or step of the particular vehicle 12. The inspection unit 126 of the diagnostic tool 100 may conduct the inspection of the vehicle 12, and capture a still image or video of the damage area 16 when the inspection unit 126 of the computing system 124 finds the damage area 16 in the vehicle 12. The processor 118 of the computing system 124 may compare the captured image or video of the damage area 16 to the pre-existed images transmitted previously from the remote server 52, and may determine whether the damaged area 16 of the vehicle 12 is a pre-existed condition or a new condition of the vehicle 12 under inspection. However, when there is no damage area required to repair during the inspection of the vehicle 12, the system may determine that a new health condition of the vehicle 12 is same as the previous condition of the vehicle 12, and no service is required at this time. In addition the new health condition of the vehicle 12 may be stored in the remote server 52 or the cloud storage 54.

As described above, when the damage area 16 is found under the inspection of the vehicle 12, the captured still image or video may be stored in the cloud storage 54 or directly transmitted to the remote server 52 including the database 60 as shown in FIG. 6. The remote server 52 may also compare the received still image or video of the damage area 16 to the original images already stored in the remote server 52 under the recorded VIN 22. In addition, the agent 56 (or the insurance adjuster) sitting in his/her office in remote distance may communicate with the user in real time for discussing the damage area 16 of the vehicle 12 based on the captured still image or video. For example, the audio capturing device such as the microphone 112 may be utilized by the user to interact with the agent 56. The agent 56 generally checks the captured still image or video, the basic information and the history information under the VIN 22 associated with the vehicle 12 through the network 62

According to an exemplary form of the present disclosure, the inspection unit 126 of the diagnostic tool 100 includes the laser pointer 108 for measuring a size or dimension of the damage area 16 or any parts which need to be checked its wear condition such as a tire or a brake of the vehicle 12. Accordingly, the size including a depth of the damage area 16 may be measured and recorded in each of the memory 116 of the diagnostic tool 100, the cloud storage 54, and the remote server 52. Furthermore, the user may communicate with the agent 56 in real time based on the measured dimensions whether the damage area 16 can be repaired or needs to be replaced with a new part. The agent 56 may check the measured dimension of the damage area 16 directly from the remote server 52 or the cloud storage 54. In addition, the tire of the vehicle 12 under inspection may be measured by the laser pointer 108 for checking a tread depth and wear condition of the tire. Based on the measured information, it may be determined whether the tire needs to be replaced, and the decision is communicated with the user in real time.

In FIGS. 5 and 6, the inspection unit 126 further may include the thermometer 110 inspecting any parts which need a cooling system in the vehicle 12 or the machine tool 14. The thermometer 110 may measure and collect a thermal data, and stores in the memory 116, the remote server 52, and the cloud storage 54 in real time. In addition, the user may communicate with the agent 56 who checks the thermal data from the stored database 60 in real time, and it may be determined whether the cooling system needs to be repaired or replaced. In addition, the diagnostic tool 100 may inspect a sound of any parts which are running in the vehicle 12 or machine tool 14 through the microphone 112 and store the sound data in the memory 116, the remote server 52, and the cloud storage 54. It may also be determined whether the recorded sound is under normal operation or needs to be repaired in real time.

Accordingly, all captured data under inspection may be transmitted to the remote server 52 including the database 60 and the cloud storage 54. The transmitted data may be recorded and stored in the servers as the new health condition of the vehicle 12 associated with the VIN 22. Therefore, the latest health condition of the vehicle 12 may be stored in the remote server 52 including the database 60 and the cloud storage 54 for later use.

Figure 7:
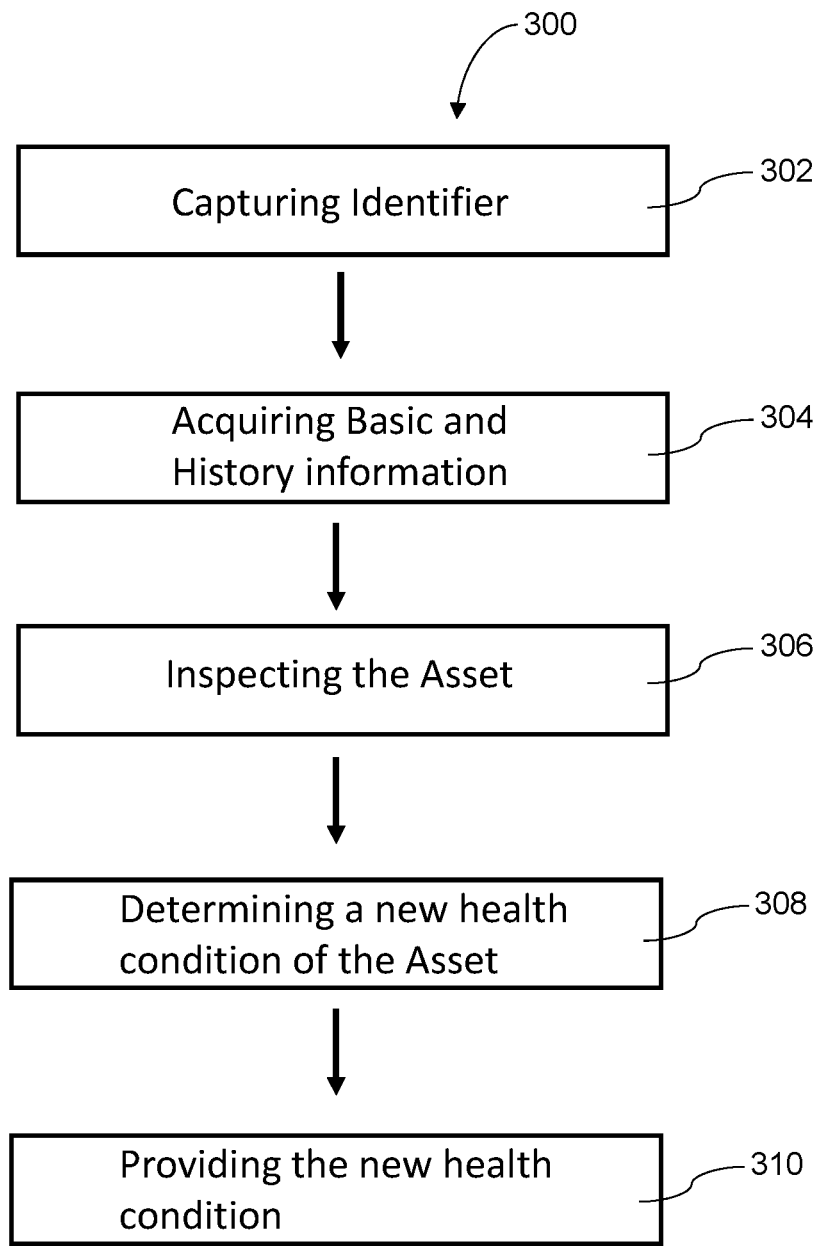
FIG. 7 is a flow chart illustrating a method of the diagnostic system according to an exemplary form of the present disclosure.

FIG. 7 is a flowchart 300 illustrating a method for determining a condition of the vehicle 12 under inspection according to an exemplary form of the present disclosure. However, the method illustrated in the flowchart 300 can be applied to any other assets 10 including the machine tool 14 because the flowchart 300 is illustrated as an example of the present disclosure. At step 302, the diagnostic tool 100 acquires (or captures) the identifier 20 associated with the vehicle 12 under inspection. In the vehicle 12, the identifier 20 may include, but not limited to, the vehicle identification number (VIN) 22. When the VIN 22 is not available in the vehicle 12 under inspection, other types of identifiers 20 such as a plate number or a bar code 24 may be associated with the vehicle 12. After that, the computing system 124 of the diagnostic tool 100 may automatically transmit the acquired VIN 22 information to the remote server 52.

At step 304, the set of condition data (or information) corresponding to the vehicle 12 may be acquired. As discussed above, the set of condition data may include, but is not limited to, the basic information such as a model, a type, a make, and a year of the vehicle 12, etc., and the history information such as the inspection history, the regular checkup history, and the accident history, etc. In addition, the diagnostic tool 100 may acquire the inspection standard procedure or step provided from the manufacturer of the particular vehicle 12 under inspection. Accordingly, the diagnostic tool 100 may follow the inspection procedure provided from the manufacturer of the vehicle 12.

At step 306, the exterior and/or interior conditions of the vehicle 12 may be inspected. As discussed above, for example, the diagnostic tool 100 may capture the image or video of the vehicle 12 according to the inspection procedure or step. The diagnostic tool 100 may capture the damage area 16 such as a dent or broken part, measure its size or dimension with the laser pointer 108 if necessary, and may automatically store the captured image or video and the measured dimension or size of the damage area 16 in the memory 116, the cloud storage 54, and the remote server 52 including the database 60 under the VIN 22 information. So, the agent 56 (or the insurance adjuster) easily may check the recorded data and communicates with the user in real time.

At step 308, it may be determined that the damage area 16 is a new health condition of the vehicle 12, and the damage area 16 may be repaired or replaced by communicating with the agent 56 or the remote server 52 in real time. In the remote server 52, the new condition with the damage area 16 may be compared to the original image of the area, and it may be determined to repair the damage area 16. As an alternative way, furthermore, the agent 56 may be determined whether the damage area 16 needs to be repaired by checking the captured image or video stored in the database 60 in real time.

At step 310, the new health condition such as a service information or a newly updated inspection information of the vehicle 12 may be provided to the diagnostic tool 100 in real time. The new health condition of the vehicle 12 may be stored in the memory 116 of the diagnostic tool 100, and the user checks the new heath condition of the vehicle 12. In addition, the new health condition of the vehicle 12 may be communicated by the agent 56 in real time, and stored in the various servers including the cloud storage 54 and the database 60 for later use.

Figure 8:
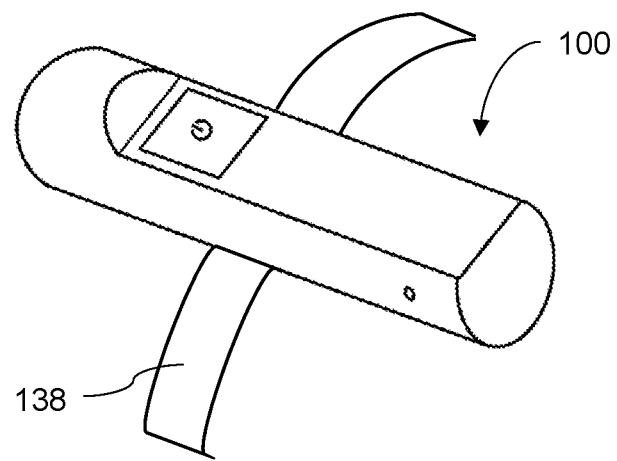
FIG. 8 is a perspective view of a wearable diagnostic tool according to an exemplary form of the present disclosure.
Figure 9:
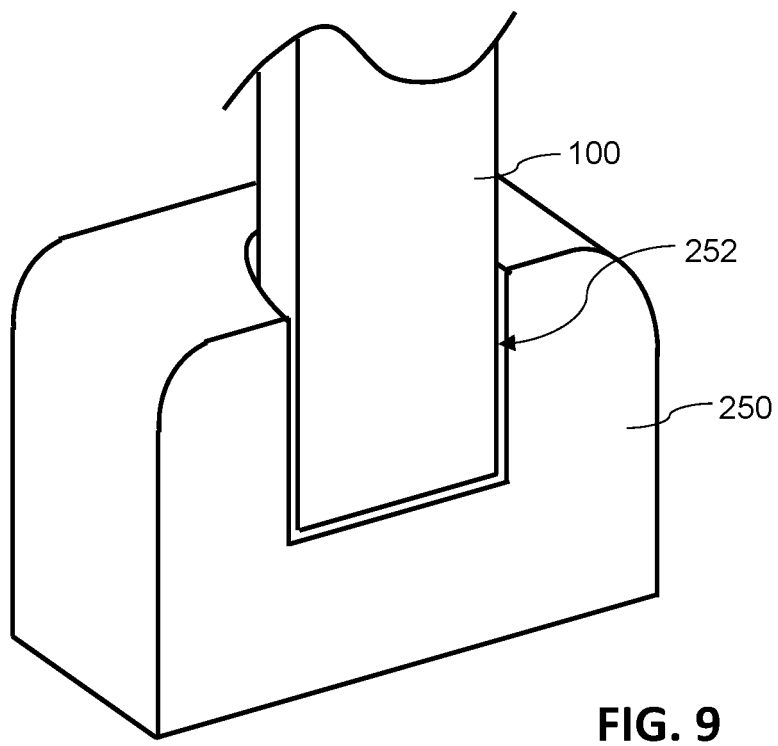
FIG. 9 is a perspective view of a docking station with the diagnostic tool according to an exemplary form of the present disclosure.

Referring to FIG. 8, the diagnostic tool 100 may be attached to the user as a wearable tool 100 with a nylon strap 138. Accordingly, the diagnostic tool 100 may be secured to the user. Referring to FIG. 9, a docking station 250 may be provided for accepting the diagnostic tool 100. The docking station 250 may include an opening 252 for placing the diagnostic tool 100, and the shape of the opening 252 is changed according to the design of the diagnostic tool 100. The docking station 250 may be wall mountable or placed on a table. In addition, the diagnostic tool 100 may have the contact points 120 (shown in FIG. 1) for charging Li-ion battery of the diagnostic tool 100 when the diagnostic tool 100 is placed in the opening 252 of the docking station 250. The docking station 250 may also provide a connection to a dedicated network, for example to bypass a firewall protected network, and provide that network connection to the diagnostic tool 100 through connection with the docking station 250 either wirelessly (e.g. WiFi, Bluetooth, or other) or through the contact points 120. If connection is provided through the contact points, data can be stored in a memory on the diagnostic tool 100 and downloaded over the network connection, for example during a low traffic time for the network.

While the above description constitutes the preferred embodiments of the present invention, it will be appreciated that the invention is susceptible to modification, variation and change without departing from the proper scope and fair meaning of the accompanying claims.

What is claimed is:

1. A diagnostic tool having a processor and a memory for determining a condition of a vehicle, the diagnostic tool comprising:
   an elongated body sized to be grasped by hand, the elongated body having an outer surface extending between a first end and a second end opposite the first end;
   an inspection unit including,
      a camera capturing an image or video of the vehicle, the camera or a scanner acquiring a vehicle identification number (VIN) associated with the vehicle; and
      a communication unit including:
         a transceiver transmitting and receiving messages and data to/from various components of a system environment, and
      a user interface unit including:
         a microphone recording a voice-inspection or communicating with the components of the system environment in a real time; and
         a speaker delivering the received messages and data to a user,
   wherein the inspection unit is positioned on an end surface of one of the first and second ends of the elongated body,
   wherein the diagnostic tool receives an inspection procedure transmitted from the system environment based on the acquired VIN, and inspects the vehicle according to the inspection procedure of the vehicle associated with the acquired VIN, and
   wherein the inspection unit further includes a laser pointer configured to produce a reflection on the vehicle that is visible to the camera to identify areas of concern, and wherein the diagnostic tool captures a still image or video of the vehicle under inspection having the reflection of the laser pointer, and transmits the captured still image or video to a remote server.

2. The diagnostic tool of claim 1, wherein the communication unit transmits the acquired VIN information to a remote server including a database, and receives basic information including the inspection procedure, and history information of the vehicle associated with the acquired VIN.

3. The diagnostic tool of claim 2, wherein the basic information includes a make, a model, a year, and a type of the vehicle, and the inspection procedure provided from a manufacturer of the vehicle, and the history information includes a previous inspection record including a maintenance record, and an accident record.

4. A diagnostic tool having a processor and a memory for determining a condition of a vehicle, the diagnostic tool comprising:
   an elongated body sized to be grasped by hand, the elongated body having an outer surface extending between a first end and a second end opposite the first end;
   an inspection unit including,
      a camera capturing an image or video of the vehicle, the camera or a scanner acquiring a vehicle identification number (VIN) associated with the vehicle;
      a laser pointer measuring a size of a damage area of the vehicle; and
      a thermometer measuring a thermal data on a part of the vehicle;
   a communication unit including,
      a transceiver transmitting and receiving messages and data to/from various components of a system environment; and
   a user interface unit including,
      a microphone recording a voice-inspection or communicating with the components of the system environment in a real time; and
      a speaker delivering the received messages and data to a user;
   wherein the inspection unit is positioned on an end surface of one of the first and second ends of the elongated body,
   wherein the diagnostic tool receives an inspection procedure transmitted from the system environment based on the acquired VIN, and inspects the vehicle according to the inspection procedure of the vehicle associated with the acquired VIN.

5. The diagnostic tool of claim 4, wherein the diagnostic tool captures a still image or video of the vehicle under inspection, measures the size of the damage area of the vehicle, and transmits the captured still image or video and the measured size to store in a remote server including a database, and a cloud storage.

6. The diagnostic tool of claim 5, wherein the captured and measured data of the vehicle under inspection are compared to basic and history information of the vehicle, and a new health condition of the vehicle is determined.

7. The diagnostic tool of claim 6, wherein the new health condition of the vehicle under inspection is determined by communicating with an agent in real time through the microphone of the diagnostic tool and/or a connected device, and a service information for repairing the damage area of the vehicle is provided.

8. A method for determining a condition of an asset, the method comprising the steps of:
   capturing an identifier associated with the asset using a diagnostic tool;
   acquiring basic information including an inspection procedure provided from a manufacturer of the asset and history information of the asset associated with the captured identifier;
   inspecting an exterior and interior condition of the asset according to the acquired inspection procedure using the diagnostic tool;
   capturing an image or video on the interior and exterior condition of the asset using a camera of the diagnostic tool;
   measuring a size of a damage area of the asset under inspection using a laser pointer of the diagnostic tool;
   determining a new health condition of the asset by communicating with an agent in real time through the diagnostic tool and comparing the inspected exterior and interior condition to the acquired basic and history information of the asset; and
   providing the new health condition of the asset including a service information by communicating with a system environment in real time.

9. The method of claim 8 further comprising the steps of transmitting the captured identifier information to a remote server including a database, and receiving the basic information and the history information of the asset associated with the captured identifier.

10. The method of claim 8, wherein the identifier includes a vehicle identification number (VIN), a bar code or a QR code.

11. The method of claim 8, wherein the basic information includes a make, a model, a year, and a type of the asset, and the inspection procedure provided from the manufacturer of the asset, and the history information includes a previous inspection record including a maintenance record, and an accident record.

12. The method of claim 8 further comprising the step of measuring a thermal data of the asset under inspection using a thermometer of the diagnostic tool.

13. The method of claim 12 further comprising the step of comparing the captured image or video and the measured size or thermal data of the asset to the basic and history information of the asset associated with the acquired identifier.

14. The method of claim 8 further comprising the step of diagnosing the new health condition of the asset and storing the new health condition of the asset under inspection in a remote server including a database, and a cloud storage.

15. The method of claim 8 further comprising the step of communicating with an agent sitting in a remote office for determining the new health condition of the asset in real time.

16. The method of claim 8, wherein the asset includes a vehicle or a machine tool.

17. The diagnostic tool of claim 1, wherein the user interface unit is on the outer surface of the elongated body.

18. The diagnostic tool of claim 4, wherein the inspection unit further includes a laser pointer configured to produce a reflection on the vehicle that is visible to the camera to identify areas of concern, and wherein the diagnostic tool captures a still image or video of the vehicle under inspection having the reflection of the laser pointer, and transmits the captured still image or video to a remote server.

19. The method of claim 8, wherein the agent is located remote from the asset and collaboratively reviews the new health condition of the asset with a user of the diagnostic tool to determine if the new health condition can be repaired or requires replacement.

20. The method of claim 8, wherein the diagnostic tool speaks the inspection procedure step by step to a user of the diagnostic tool.

\* \* \* \* \*